United States Patent Office 3,499,853
Patented Mar. 10, 1970

3,499,853
POLYAMIDES
Eugen Griebsch, Unna, and Manfred Drawert, Werne an der Lippe, Germany, assignors to Schering AG., Berlin, Germany
No Drawing. Continuation-in-part of application Ser. No. 456,856, May 18, 1965. This application Mar. 22, 1968, Ser. No. 715,170
Claims priority, application Germany, May 23, 1964, Sch 35,202; Mar. 26, 1965, Sch 36,783, Sch 36,784
Int. Cl. C08g 20/26
U.S. Cl. 260—18
22 Claims

ABSTRACT OF THE DISCLOSURE

Copolyamides useful as thermoplastic adhesives of high peeling resistance comprising, and made by co-condensing, a largely dimeric fatty acid, an optional other dicarboxylic acid, and an amine component comprising an ether diamine alone or in admixture with ethylene diamine, or ethylene diamine in admixture with another aliphatic diamine.

---

The invention relates to polyamides comprising a polymeric fatty acid, and to the manufacture of such polyamides.

This application is a continuation-in-part of Ser. No. 456,856 filed May 18, 1965 and now abandoned.

Polyamides prepared from dimerized or polymeric fatty acids and diamines have already been described in the art. However, due to their brittleness, they have poor adhesive properties. Polyamides of polymeric fatty acids in which the content of dimeric fatty acid is at least 80% are also known. While these polyamides are less brittle, their adhesive properties are, however, only very slightly improved.

Polyamides or polymeric fatty acids and mixtures of alkylene diamines and polyalkylene polyamines have also been described in the art. These polyamides have free amino groups and have considerable disadvantages, such as defective internal coherence and surface tackiness.

According to the present invention, copolyamides having a high resistance to peeling which makes them particularly useful as thermoplastic adhesives are prepared from polymeric fatty acids, optionally together with one or more monomeric aliphatic, araliphatic, or aromatic dicarboxylic acids, and aliphatic diamines by reaction at temperatures between 180° C. and 250° C. Depending on the amine component, the polymeric fatty acid may contain from about 55% to 100% by weight of dimeric fatty acid. As the diamine component, there is used:

(a) A mixture of ethylene diamine and an aliphatic diamine having a chain length of 4 to 12 C-atoms and which also may bear 1 to 3 lower alkyl substituents or a higher alkyl substituent, the equivalent ratio between ethylene diamine and the simultaneously employed diamine being between about 0.2:0.2 and about 0.5:0.5, preferably about 0.6:0.4; or (b) An ether diamine of the general formula

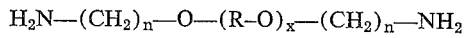

in which each $n$ is a whole number from 3 to 5, $x$ has the value 0, 1, 2, or 3, and in which R is an alkylene radical having a chain length of from 1 to 12 C-atoms which may also optionally have an alkyl substituent of 1 to 4 C-atoms.

(c) A mixture of ethylene diamine and an ether diamine as in (b) above, in which mixture the equivalent ratio of ethylene diamine to the ether diamine may be as high as about 0.9:0.1, and is preferably between about 0.7:0.3 and about 0.6:0.4.

The new polyamides are condensation products formed between (A) a largely dimeric fatty acid, (B) optional aliphatic, araliphatic or aromatic dicarboxylic acids and, (C) a diamine or diamine mixture as described in (a), (b), or (c) above. In general, they have a melt viscosity at 200° C. between about 5 and about 1000 poises, preferably between about 10 and about 250 poises.

The polyamides of the invention are prepared by reacting substantially equivalent quantities of the diamine with the free acids or their amide-forming derivatives, particularly their esters, at condensation temperatures between about 180° C. and about 250° C., and in particular at about 230° C. Any water of condensation remaining is suitably removed by applying a vacuum of from 15 mm. to 20 mm./Hg for 1 to 2 hours.

Instead of the free acids, their amide-forming derivatives, and particularly their acid esters, can also be used, particularly those esters which can be easily subjected to aminolysis, such as the methyl and ethyl esters.

The dimeric fatty acids employed in the polyamide polymers of the invention are prepared either by free radical or ionic polymerization, or by thermal dimerization, of a monomeric fatty acid. The monomeric fatty acid can be a saturated, or ethylenically or acetylenically unsaturated natural or synthetic aliphatic mono-basic acid having from 8 to 24 carbon atoms. These fatty acids can be polymerized in different ways, but give functionally similar products which can be characterized generally as polymeric fatty acids. The latter usually contain a predominant part of dimeric fatty acid and smaller amounts of trimeric or higher polymeric acids as well as monomeric fatty acids.

The polymerization of a saturated fatty acid can take place at elevated temperatures with peroxide catalysts such as di-t-butyl peroxide, for example. Because of the small yields, this process is of little interest. In the process, saturated fatty acids, both branch chain and straight chain materials, can be employed, such as caprylic acid, pelargonic acid, capric acid, lauric acid, myristic acid, palmitic acid, isopalmitic acid, stearic acid, arachidic acid, behenic acid, and lignoceric acid.

It is much more common to polymerize ethylenically unsaturated fatty acids. This can be done with or without catalysts, with higher temperatures being required for the uncatalyzed polymerization. Suitable catalysts are acid or alkaline clays, di-t-butyl peroxide, boron trifluoride and other Lewis acids, anthraquinone, sulfur trioxide, and the like. Mono- and/or poly-ethylenically unsaturated acids, both branch chain and straight chain materials can be employed, such as, for example, 3-octene acid, 11-dodecene acid, linderic acid, lauroleinic acid, oleic acid, elaidic acid, vaccenic acid, gadoleic acid, cetoleic acid, nervonic acid, erucic acid, linoleic acid, linolenic acid, elaeosteric acid, arachidonic acid, clupanodonic acid, nisinic acid, and chulmoogra oil acid.

Acetylenically unsaturated fatty acids can be polymerized in the absence of catalyst because of the higher reactivity of the materials. However, they are rare in nature and are expensive to synthesize. For this reason, they are economically of little interest. However, a number of acetylenically unsaturated fatty acids, both straight chain and branch chain, mono- and/or poly-unsaturated materials, are suitable for the preparation of polymeric fatty acids, for example 6-octadecyne acid, 9-octadecyne acid, 13-dokosyne acid, and 17-octadecene-9,11-diyne acid.

Because of the cheapness and relatively easy polymerizability, oleic and linoleic acid are preferred as the starting materials for the preparation of polymeric fatty acids.

The usual approximate composition of commercially available dimeric fatty acids, prepared from unsaturated $C_{18}$ fatty acid, is

|  | Percent by weight |
| --- | --- |
| $C_{18}$-monocarboxylic acid | 5–15 |
| $C_{36}$-dicarboxylic acid | 60–80 |
| $C_{54}$-(and higher) tricarboxylic acids | 10–35 |

The mixtures obtained by polymerization can be fractionated by conventional distillation or solvent extraction methods. The acids can be hydrogenated before or after distillation in order to decrease the degree of unsaturation, by subjection to high pressure hydrogen atmospheres in the presence of a hydrogenation catalyst.

When the diamine used is a mixture of ethylene diamine and an aliphatic diamine as in (a) above, the polymeric fatty acid is preferably 90 to 100% dimeric. When the diamine is an ether diamine alone as in (b), or in admixture with ethylene diamine as in (c), the content of dimeric acid may be between about 55% and 100%.

Gelation of the polyamide during the preparation will be avoided by the presence of a monomeric fatty acid [see Cowan, Oil and Soap, 22 (143–148), (1945)], and, furthermore, material of a desirable viscosity will be obtained. Since, as is known, the tendency to gel depends on the content of trimeric fatty acid, it is advisable that with an increase in the amount of trimeric fatty acid in the polymeric fatty acid, the amount of monomeric fatty acid also be increased.

While a mixture of 95% dimeric fatty acid and 5% trimeric fatty acid gels upon conversion into the polyamides of the invention, this gelation is definitely prevented if 25% of the trimeric fatty acid present is replaced by monomeric fatty acid. In the case of a 90% dimeric fatty acid containing 10% trimeric fatty acid, gelation is prevented by a 50% replacement of the trimeric fatty acid by monomeric fatty acid. The content of dimeric fatty acid may even be less than 55% providing that the ratio of trimeric to monomeric fatty acids is not greater than 6.1. The monomeric fatty acid acts as a chain terminating agent in the polymerization.

As dicarboxylic acids suitable for copolymerization with fatty acids to form the polyamides of the invention, adipic acid, pimelic acid, suberic acid, azelaic acid, sebacic acid, nonane dicarboxylic acid, decane dicarboxylic acid, terephthalic acid, p-phenylene diacetic acid, and p-phenylene dipropionic acid, and the like can be employed in amounts of up to about 20% by weight of the fatty acid component.

Suitable aliphatic diamines having 4 to 12 C-atoms are materials such as tetramethylene diamine, pentamethylene diamine, hexamethylene diamine, heptamethylene diamine, octamethylene diamine, nonamethylene diamine, decamethylene diamine, undecamethylene diamine, and dodecamethylene diamine.

As aliphatic diamines having 1 to 3 lower alkyl substituents, or a higher alkyl substituent, there come into consideration materials such as 2,5-dimethyl hexamethylene diamine, 2-methyl-4-ethyl-hexamethylene diamine, 2-ethyl-4-methyl-hexamethylene diamine, mixtures of 2,4,4-trimethyl-hexamethylene diamine and 2,2,4-trimethyl-hexamethylene diamine, and mixtures of 9-amino-methyl stearyl amine and 10-aminomethyl stearyl amine, for example.

Ether diamines of the general formula earlier given and which can be used in the method of the invention can be prepared by known methods, for instance by cyanoethylation of the corresponding dihydroxy compounds followed by catalytic reduction of the resultant dinitriles, by reaction of ω,ω'-dihaloethers with alkali cyanides followed by reduction of the dinitriles, or by reaction of tetrahydrofuran with thionyl chloride to 4,4'-dichlorobutyl ether, followed by reaction with alkali cyanides and catalytic reduction of the dinitrile. As examples of such ether diamines, mention may be made, for instance of 1,7-diamino-4-oxa-heptane; 1,11-diamino-6-oxa-undecane; 1,7-diamino - 3,5 - dioxaheptane; 1,10 - diamino - 4,7-dioxadecane; 1,10 - diamino - 4,7 - dioxa - 5 - methyl decane; 1,11 - diamino - 4,8 - dioxa - undecane; 1,11 - diamino-4,8 - dioxa - 5 - ethyl - undecane; 1,12 - diamino - 4,9-dioxa - dodecane; 1,13 - diamino - 4,10 - dioxa-tridecane; 1,14 - diamino - 4,11 - dioxa - tetradecane; 1,11 - diamino-4,8 - dioxa - 5,6 - dimethyl - 7 - propionyl - undecane; 1,14 - diamino - 4,7,10 - trioxa-tetradecane; 1,13-diamino-4,7,10 - trioxa - 5,8 - dimethyl - tridecane; 1,20-diamino-4,17 - dioxa - eisocane; 1,16 - diamino - 4,7,10,13-tetraoxahexadecane.

The polyamides of the invention comprising dimeric fatty acid and a mixture of ethylene diamine and an aliphatic diamine having a chain length of 4 to 12 C-atoms are characterized not only by good adhesive properties, particularly resistance to peeling, but also by the fact that they are soluble in ordinary organic solvents, such as alcohols and mixtures thereof with gasolines or aromatics. The solutions are resistant to gelation at room temperature. For this reason, the products can be used both as thermoplastic adhesives and as heat-sealing adhesives.

The adhesive properties of these polyamides increase with an increase in the molecular weight or with an increase in the melt viscosity. For reasons of processing, at the present time, however, a melt-viscosity range of between 20 poises and 50 poises at the processing temperatures is preferred, which region can definitely be varied when using improved processing machines.

The polyamides of the invention have considerably better adhesive properties than known polyamides even at temperatures below 0° C., as evidenced particularly by an excellent resistance to peeling on different materials, and an absolute stability of the initial adhesive values which, in part, even show a tendency to increase with time. Furthermore, the polyamides of the invention, due to their good resistance to hydrolysis, are practically insensitive to the influence of moisture.

The polyamides of the invention which have been prepared without a co-dicarboxylic acid component furthermore show good solubility properties and can therefore be used also as heat-sealing adhesives.

The polyamides of the invention prepared from a dimeric fatty acid, an aliphatic, araliphatic, or aromatic co-dicarboxylic acid, and a mixture of ethylene diamine and an aliphatic diamine having a chain length of 4 to 12 C-atoms are characterized by better resistance to peeling than the known polyamides. It could not be foreseen that the use of the diamine mixture and the simultaneous use of a co-dicarboxylic acid, would result in polyamides with such substantially improved resistance to peeling.

By the simultaneous use of a co-dicarboxylic acid, such as adipic acid, pimelic acid, suberic acid, azelaic acid, sebacic acid, nonane dicarboxylic acid, or decane dicarboxylic acid, for example, or an aromatic dicarboxylic acid such as terephthalic acid, or araliphatic dicarboxylic acids such as p-phenylene diacetic acid and p-phenylene dipropionic acid, for example, it is possible to influence the softening point of the polyamide of the invention. The last two mentioned araliphatic dicarboxylic acids can be mono- or dimethyl-substituted. With increasing incorporation of a co-dicarboxylic acid, not only the softening point of the polyamide, but also the resistance to peeling of the adhesive, is influenced. The effect on the resistance to peeling depends on the nature of the dicarboxylic acid used.

This effect is particularly noticeable when adipic acid is employed. In this case, the resistance to peeling shows a tendency to decrease with an increasing incorporation of adipic acid, the amount of the decrease being dependent on the quality of the dimeric fatty acid which is used, as well as on the nature of the codiamine which is used.

Thus, for instance, the decrease in the resistance to peeling is smaller with increasing incorporation of adipic acid the purer the dimeric fatty acid and the more branched the codiamine. When using a co-dicarboxylic acid having a larger number of carbon atoms, such as azelaic acid or sebacic acid, this effect cannot be observed.

Terephthalic acid assumes a special position. In this case with increasing incorporation of the acid an increase in the resistance to peeling is observed.

In order to obtain equal softening points in the polyamides, the quantity of acid which must be incorporated is greater the greater the number of C-atoms of the co-dicarboxylic acid, in the case of aliphatic co-dicarboxylic acids. For instance, in order to obtain a polyamide having a softening point of 165° C. which comprises a dimeric fatty acid, and ethylene diamine and hexamethylene diamine in an equivalent ratio of 0.6:0.4, 10% of adipic acid or 20% of sebacic acid by weight of the dimeric fatty acid is required. If an aromatic co-dicarboxylic acid, such as terephthalic acid, is used, an addition of only 3% is sufficient to obtain a softening point of 162° C.

Mixtures of co-dicarboxylic acids can also be used.

The polyamides of the invention comprising a high content of dimeric fatty acid, an aliphatic, araliphatic or aromatic co-dicarboxylic acid, and a diamine mixture of ethylene diamine and an ether diamine are also characterized by higher softening points. In the case of these polyamides also, the softening point is influenced in the manner indicated above.

It could not have been predicted that the known polyamides comprising polymeric fatty acids could be so substantially improved with respect to their adhesive properties, and particularly their resistance to peeling, by the use of ether diamines in accordance with the invention. 1,11-diamino-4,8-dioxa-undecane and 1,12 - diamino-4,9-dioxadodecane have proved to be particularly favorable diamines. Even unfilled polyamides of the invention which contain these diamines have resistances to peeling with peak values of 7 to 10 kg./cm.$^2$.

A better understanding of the present invention and of its many advantages will be had by referring to the following specific examples, given by way of illustration.

EXAMPLE 1

400 grams of a 99% dimeric fatty acid having a molecular weight of about 570 (saponification number 197), prepared from a $C_{18}$-fatty acid, were mixed with 52 gms. of adipic acid and 49.4 gms. of hexamethylene diamine (amine number 964) and, after heating to 60° C., 38.8 gms. of ethylene diamine (amine number 1865) were added. The molar ratio of ethylene diamine:hexamethylene diamine was 0.6:0.4.

Within two hours, the reaction temperature was brought to 230° C. and kept for four hours at this temperature. During the last two hours, a vacuum of about 20 mm./Hg was applied. The resultant polyamide has an amine number of 2.7 and an acid number of 1.6. The softening point is 172° C. (ring and ball method). The product has a resistance to peeling of 7.78 kg./cm. (measured on steel).

Other polyamides were prepared in similar manner, as shown in Table I below, using 400 gms. of 96% dimeric fatty acid in each case and adipic acid as the co-dicarboxylic acid.

TABLE I

| Example: | Adipic Acid (gms.) | Chain Stopper (gms.) | Ethylene Diamine (gms.) | Co-diamine (gms.) | Equivalent Ratio of Amines | Polymer Amine No. | Acid No. | Softening Point | Peeling Resistance (kg./cm.) |
|---|---|---|---|---|---|---|---|---|---|
| 2 | 40 | Stearic Acid, 20 | 41.3 | HDA, 34.5 | 0.7:0.3 | 2.11 | 2.20 | 170 | 5.43 |
| 3 | 10 | Soya Oil Fatty Acid, 16 | 32.8 | HDA, 27.3 | 0.7:0.3 | 2.03 | 2.00 | 125 | 4.70 |
| 4 | 52 | Stearic Acid, 16 | 39.35 | HDA, 50.75 | 0.6:0.4 | 2.50 | 1.62 | 173 | 7.41 |
| 5 | 52 | Soya Oil Fatty Acid, 20 | 39.5 | HDA, 50.8 | 0.6:0.4 | 2.75 | 1.49 | 174 | 4.56 |
| 6 | 12 |  | 29.6 | HDA, 38.2 | 0.6:0.4 | 1.73 | 1.91 | 117 | 5.24 |
| 7 | 16 |  | 24.5 | NDA, 65.0 | 0.5:0.5 | 1.90 | 2.62 | 98 | 6.13 |
| 8 | 24 |  | 36.7 | AmSTA, 78.5 | 0.7:0.3 | 2.80 | 4.43 | 166 | 8.48 |
| 9 | 40 |  | 41.3 | AmSTA, 88.4 | 0.7:0.3 | 2.22 | 4.49 | 195 | 5.69 |
| 10 | (¹) |  | 38.1 | 31.5 | 0.7:0.3 | 2.50 | 2.15 | 135 | 5.30 |

¹ Sebacic acid.
HDA=Hexamethylene Diamine.
NDA=Nonamethylene Diamine.
AmSTA=Mixture of 9-aminomethyl stearylamine and 10-aminomethyl stearylamine.

For purposes of comparison, a number of polymers outside the scope of the invention were prepared, as tabulated in Table II below. For Examples 11 and 12, 400 gms. of 96% dimeric fatty acid were employed; in Example 13, the same amount of 75% acid was used. The co-dicarboxylic acid is adipic acid.

TABLE II

| Example: | Adipic Acid (gms.) | Ethylene Diamine (gms.) | Co-diamine (gms.) | Equivalent Ratio of Amine | Polymer Amine No. | Acid No. | Softening Point (° C.) | Peeling Resistance (kg./cm.) |
|---|---|---|---|---|---|---|---|---|
| 11 |  | 42.5 |  |  | 2.99 | 2.40 | 105 | 1.42 |
| 12 | 16 | 49.1 |  |  | 2.46 | 4.08 | 179 | 1.53 |
| 13 | 40 | 35.3 | Hexamethylene Diamine, 45.9 | 0.6:0.4 | 3.09 | 1.80 | 162 | 1.13 |

EXAMPLE 14

420 gms. of the dimethyl ester of a dimeric fatty acid, 23.73 gms. of the dimethyl ester of terephthalic acid, 35.3 gms. of ethylene diamine, and 29.2 gms. of hexamethylene diamine (equivalent ratio of the amines=0.7:0.3) were condensed to give a polymer having an amine number of 2.69, an acid number of 2.34, a softening point of 171° C., and a peeling resistance of 4.80 kg./cm.

EXAMPLE 15

200 gms. of dimerized fatty acid containing 96% of dimeric fatty acid were treated with 8 gms. of soya oil fatty acid and heated under nitrogen to 60° C. Thereupon 13.18 gms. of ethylene diamine (0.6 equivalent) and 17.0 gms. of 1,6-diaminohexane (0.4 equivalent) were added and the temperature increased within 2 hours to 230° C. The reaction temperature of 230° C. was maintained for 4 hours. During the last 2 hours, a vacuum of about 15 mm./Hg was applied in order to remove the remaining traces of water. The resultant polyamide resin has an amine number of 1.11, an acid number of 2.95 and a softening point (ring and ball method) of 89° C. The resistance to peeling measured on steel was 4.1 kg./cm.

In each of Examples 16–20 summarized in Table III below, 200 gms. of a 96% dimeric fatty acid, ethylene diamine, and a co-diamine were condensed in the presence of 8 gms. of soya oil fatty acid as a chain stopper.

heptane (equivalent ratio 0.7:0.3) were condensed to a polymer product having an amine number of 2.32, an acid number of 2.10, a softening point of 172° C., and a peeling resistance of 4.92 kg./cm.

TABLE III

| | Ethylene Diamine (gms.) | Co-Diamine (gms.) | Equivalent Ratio of Amines | Polymer | | | |
|---|---|---|---|---|---|---|---|
| | | | | Amine No. | Acid No. | Softening Point (° C.) | Peeling Resistance (kg./cm.) |
| Example: | | | | | | | |
| 16 | 10.98 | 1,4-diamino butane, 16.52 | 0.5:0.5 | 0.61 | 4.12 | 87 | 2.72 |
| 17 | 15.37 | 1,9-diamino nonane, 17.35 | 0.7:0.3 | 0.72 | 4.65 | 97 | 4.66 |
| 18 | 17.58 | 1,12-diamino dodecane, 14.70 | 0.8:0.2 | 1.06 | 4.09 | 103 | 4.56 |
| 19 | 17.58 | Diamino-isononane-decane-1,8/1,9 | 0.8:0.2 | 0.83 | 4.34 | 102.5 | 4.61 |
| 20 | 13.18 | Trimethyl-hexamethylene-diamine, 23.10 | 0.6:0.4 | 0.77 | 3.37 | 93 | 4.81 |

EXAMPLE 21

For purposes of comparison, a polymer outside the scope of the present invention was prepared from 400 gms. of 96% dimeric fatty acid and 42.5 gms. of ethylene diamine. The product had an amine number of 2.99, an acid number of 2.40, a softening point of 105° C., and a resistance to peeling of 1.42 kg./cm.

For purposes of comparison, two polymers outside the scope of the invention were prepared, as tabulated in Table V below. In each case, 400 gms. of 96% dimeric fatty acid were reacted. The co-acid was adipic acid.

TABLE V

| | Adipic Acid (gms.) | Free Coacid (percent by weight of fatty acid) | Ethylene Diamine (gms.) | Polymer | | | |
|---|---|---|---|---|---|---|---|
| | | | | Amine No. | Acid No. | Softening Point (° C.) | Peeling Resistance (kg./cm.) |
| Example: | | | | | | | |
| 33 | | | 42.5 | 2.99 | 2.40 | 105 | 1.42 |
| 34 | 16 | 4 | 49.1 | 2.46 | 4.08 | 179 | 1.53 |

EXAMPLE 22

400 gms. of dimerized fatty acid having a dimeric fatty acid content of 96% were treated with 8.0 gms. of adipic acid and heated in 15 minutes to 60° C. under nitrogen. Thereupon 31.9 gms. of ethylene diamine (0.7 equivalents) and 43.30 gms. of 1,11-diamino-4,8-dioxa-undecane (0.3 equivalents) were added and the temperature of the batch increased within 2 hours to 230° C. The reaction temperature was maintained for 4 hours at 230° C. During the last two hours, a vacuum of 20 mm./Hg was applied. The polyamide has an amine number of 2.81, an acid number of 2.23, and a softening point (ring and ball method) of 115° C. The resistance to peeling (measured after 7 days on steel) was 10.12 kg./cm., the tensile shear strength 0.82 kg./mm.²

The polyamides of Examples 23–27 (Table IV) were obtained in similar manner using 400 gms. of 96% dimeric fatty acid. The polymers of Examples 28–31 are prepared from 200 gms. of the same acid. Adipic acid was used as the co-dicarboxylic acid.

EXAMPLE 35

400 grams of a polymeric $C_{18}$ fatty acid having a dimeric fatty acid content of 71 percent were mixed with 16 grams of adipic acid, 29.3 grams of ethylene diamine (0.6 equivalent), and 68.4 grams of 1,12-diamino-4,9-dioxadodecane (0.4 equivalent) and heated to 230° C. over a period of two hours. The temperature was maintained at 230° C. for four hours, during the last two of which a vacuum of 20 mm./Hg was applied.

The polyamide resin obtained had an amine number of 4.20, an acid number of 1.17, and a ring and ball softening point of 139° C.

The product showed the following adhesive values, measured on steel:

| | 20° C. | 0° C. | −10° C. | −20° C. |
|---|---|---|---|---|
| Resistance to peeling (kg./cm.) | 4.99 | 7.13 | 6.08 | 3.1 |
| Shear strength (kg./mm.²) | 0.79 | 1.24 | 1.39 | 1.24 |

The polyamides of Examples 36–47 were prepared in an analogous fashion using adipic acid as the co-acid.

TABLE IV

| | Adipic Acid (gms.) | Free Coacid (percent by weight of fatty acid) | Ethylene Diamine (gms.) | Co-diamine (gms.) | Equivalent Ratio of Amines | Polymer | | | |
|---|---|---|---|---|---|---|---|---|---|
| | | | | | | Amine No. | Acid No. | Softening Point (° C.) | Peeling Resistance (kg./cm.) |
| Example: | | | | | | | | | |
| 23 | 40 | 10 | 35.24 | 1,7-diamino-4-oxa heptane, 52.40 | 0.6:0.4 | 5.67 | 2.11 | 157 | 6.68 |
| 24 | | | 29.58 | 1,10-diamino-4,7-dioxa-decane, 37.82 | 0.7:0.3 | 5.07 | 3.42 | 96.5 | 5.30 |
| 25 | | | 29.50 | 1,10-diamino-4,7-dioxa-5-methyl decane, 40.10 | 0.7:0.3 | 5.24 | 4.63 | 103 | 5.54 |
| 26 | 4 | 1 | 35.11 | 1,11-diamino-4,8-dioxa-undecane, 27.85 | 0.8:0.2 | 3.27 | 3.07 | 108 | 7.78 |
| 27 | 12 | 3 | 33.00 | 1,12-diamino-4,9-dioxa-dodecane, 48.00 | 0.7:0.3 | 1.53 | 3.04 | 130.5 | 9.87 |
| 28 | 8 | 4 | 14.65 | 1,11-diamino-4,8-dioxa-5-methyl-undecane, 33.1 | 0.6:0.4 | 3.82 | 0.83 | 112 | 6.14 |
| 29 | 6 | 3 | 16.50 | 1,13-diamino-4,10-dioxa-tridecane, 25.92 | 0.7:0.3 | 0.86 | 5.51 | 134 | 8.47 |
| 30 | 2 | 1 | 19.75 | 1,14-diamino-4,11-dioxa-tetradecane, 8.62 | 0.9:0.1 | 1.62 | 3.91 | 120 | 3.26 |
| 31 | 16 | 8 | 18.84 | 1,14-diamino-4,11-dioxa-tetradecane, 32.45 | 0.7:0.3 | 2.28 | 2.80 | 171 | 9.00 |

EXAMPLE 32

400 gms. of 96% dimeric fatty acid, 18.7 gms. of the dimethyl ester of terephthalic acid (about 4 percent, as free acid, by weight of the fatty acid), 18.84 gms. of ethylene diamine, and 18.02 gms. of 1,7-diamino-4-oxa-heptane The compositions of these polyamides is given in following Table VI. The properties of the polymers are in Table VII. The polymeric fatty acid used is polymerised tall oil fatty acid having a molecular weight of about 570.

TABLE VI

| Example: | Polymeric Fatty Acid (gms.) | Dimer Content (percent) | Co-acid (percent by weight of fatty acid) | Ethylene Diamine (gms.) | Co-diamine (gms.) | Equivalent Ratio of Amine |
|---|---|---|---|---|---|---|
| 36 | 400 | 69.6 | 10 | 35.2 | 1,12-diamino-4,9-dioxa-dodecane, 82.4 | 0.6:0.4 |
| 37 | 200 | 71.0 | 1 | 19.75 | 1,13-diamino-4,10-dioxa-tridecane, 8.04 | 0.9:0.1 |
| 38 | 200 | 71.0 | 6 | 20.85 | 1,11-diamino-4,8-dioxa-5-methyl-undecane, 17.68 | 0.8:0.2 |
| 39 | 200 | 71.0 | 3 | 16.52 | 1,11-diamino-4,8-dioxa-5,6-dimethyl-7-propyl-undecane, 31.3 | 0.7:0.3 |
| 40 | 200 | 71.0 | 2 | 18.22 | 1,13-diamino-4,7,10-trioxa-tridecane, 16.69 | 0.8:0.2 |
| 41 | 200 | 71.0 | 3 | 16.52 | 1,11-diamino-6-oxaundecane, 22.15 | 0.7:0.3 |
| 42 | 200 | 71.0 | 3 | 16.52 | 1,14-diamino-4,11-dioxa-tetradecane, 27.8 | 0.7:0.3 |
| 43 | 400 | 70.6 | 5 | 25.23 | 1,12-diamino-4,9-dioxa-dodecane, 88.5 | 0.5:0.5 |
| 44 | 400 | 70.6 | 7 | 16.15 | 1,12-diamino-4,9-dioxa-dodecane, 132.2 | 0.3:0.7 |
| 45 | 300 | 70.6 | 10 | | 1,12-diamino-4,9-dioxa-dodecane, 155.0 | 0.0:1.0 |
| 46 | 400 | 89.0 | 4 | 31.89 | 1,7-diamino-4-oxaheptane, 30.49 | 0.7:0.3 |
| 47 | 400 | 89.0 | 6 | 46.92 | 1,10-diamino-4,7-dioxa-decane, 15.68 | 0.9:0.1 |

TABLE VII

| | | | | Adhesion to Steel at Room Temperature | | Adhesion to Steel at −20° C. | |
|---|---|---|---|---|---|---|---|
| Example: | Softening Point (° C.) | Amine Number | Acid Number | Peeling Resistance (kg./cm.) | Shear Strength (kg./mm.²) | Peeling Resistance (kg./cm.) | Shear Strength (kg./mm.²) |
| 36 | 166 | 4.86 | 1.22 | 5.24 | 0.77 | 1.03 | 1.03 |
| 37 | 119 | 2.28 | 2.87 | 1.96 | 0.70 | | |
| 38 | 175 | 2.23 | 2.82 | 2.86 | 1.11 | | |
| 39 | 141 | 2.16 | 2.31 | 4.52 | 0.68 | | |
| 40 | 130 | 2.42 | 2.73 | 3.54 | 0.72 | | |
| 41 | 135.5 | 1.04 | 4.00 | 4.17 | 0.60 | | |
| 42 | 139 | 2.75 | 1.75 | 5.20 | 0.74 | | |
| 43 | 117 | 5.44 | 1.94 | 4.22 | 0.53 | 4.41 | 1.70 |
| 44 | 97.5 | 5.86 | 1.30 | 3.12 | 0.38 | 5.16 | 1.77 |
| 45 | 108.5 | 5.9 | 0.6 | 3.77 | 0.54 | 2.97 | 1.66 |
| 46 | 111 | 3.66 | 3.13 | 5.99 | 0.70 | | |
| 47 | 184 | 5.80 | 4.05 | 4.56 | 1.11 | | |

What is claimed is:

1. The method of making a polyamide polymer which comprises condensing at a temperature between about 180° C. and 250° C. substantially equivalent quantities of
   (A) an acid component comprising
      (1) a polymeric fatty acid having a high dimeric fatty acid content, in admixture with
      (2) up to about 20 percent, by weight of said polymeric fatty acid, of at least one other dicarboxylic acid; with
   (B) a diamine component selected from the group consisting of
      (1) from 0.8 to 0.5 equivalent of ethylene diamine and from 0.2 to 0.5 equivalent of another diamine selected from the group consisting of
         (a) at least one linear aliphatic diamine having 4 to 12 carbon atoms,
         (b) at least one aliphatic diamine having 4 to 12 carbon atoms in a linear chain and from 1 to 3 lower alkyl substituents each having up to 2 carbon atoms,
         (c) at least one aliphatic diamine having 4 to 12 carbon atoms in a linear chain and a higher alkyl substituent having 8 or 9 carbon atoms; or
      (2) from 0.9 to 0.5 equivalent of ethylene diamine and from 0.1 to 0.5 equivalent of another diamine selected from the group consisting of
         (a) at least one ether diamine of the formula $H_2N(CH_2)_nO(RO)_x(CH_2)_nNH_2$, where $n$ is a whole number from 3 to 5 inclusive, $x$ is a whole number from 0 to 3 inclusive, and R is an alkylene radical having from 1 to 12 carbon atoms in a linear chain, and
         (b) at least one ether diamine as in (2)(a) where R is an alkylene radical having from 1 to 12 carbon atoms in a linear chain and an alkyl substituent thereon having from 1 to 4 carbon atoms; or
      (3) from 0.9 to 0.3 equivalent of ethylene diamine and from 0.1 to 0.7 equivalent of another diamine selected from the group consisting of
         (a) at least one ether diamine of the formula $H_2N(CH_2)_nO(RO)_x(CH_2)_nNH_2$, where $n$ is a whole number from 3 to 5 inclusive, $x$ is a whole number from 0 to 3 inclusive, and R is an alkylene radical having from 1 to 12 carbon atoms in a linear chain, and
         (b) at least one ether diamine as in (2)(a) where R is an alkylene radical having from 1 to 12 carbon atoms in a linear chain and an alkyl substituent thereon having from 1 to 4 carbon atoms,
   the dimeric fatty acid content of said polymeric fatty acid (A) being from about 90 percent to 100 percent by weight when said diamine component (B) is (B)(1) or (B)(2), and being from about 55 percent to about 90 percent by weight if said diamine component (B) is (B)(3).

2. A polyamide polymer prepared according to claim 1.

3. The method as in claim 1 wherein said ether diamine is a member selected from the group consisting of
   1,7-diamino-4-oxa-heptane,
   1,10-diamino-4,7-dioxa-decane,
   1,10-diamino-4,7-dioxa-5-methyl-decane,
   1,11-diamino-4,8-dioxa-undecane,
   1,11-diamino-6-oxa-undecane,
   1,11-diamino-4,8-dioxa-5,6-dimethyl-7-propyl-undecane,
   1,11-diamino-4,8-dioxa-5-methyl-undecane,
   1,12-diamino-4,9-dioxa-dodecane,
   1,13-diamino-4,10-dioxa-tridecane,
   1,13-diamino-4,7,10-trioxa-tridecane, and
   1,14-diamino-4,11-dioxa-tetradecane.

4. The method as in claim 1 wherein said other diamine is hexamethylene diamine.

5. The method as in claim 1 wherein said other diamine is nonamethylene diamine.

6. The method as in claim 1 wherein said other diamine is a mixture of 9-aminomethylstearylamine and 10-aminomethylstearylamine.

7. The method as in claim 1 wherein said other dicarboxylic acid is adipic acid.

8. The method as in claim 1 wherein said other dicarboxylic acid is sebacic acid.

9. The method as in claim 1 wherein said other dicarboxylic acid is terephthalic acid.

10. The method as in claim 1 wherein said diamine component is as defined in (B)(1).

11. The method as in claim 1 wherein said diamine component is as defined in (B)(2).

12. The method as in claim 1 wherein said diamine component is as defined in (B)(3).

13. A polyamide polymer prepared according to claim 12.

14. A polyamide polymer prepared according to claim 10.

15. A polyamide polymer prepared according to claim 11.

16. A polyamide polymer prepared according to claim 4.

17. A polyamide polymer prepared according to claim 5.

18. A polyamide polymer prepared according to claim 6.

19. A polyamide polymer prepared according to claim 7.

20. A polyamide polymer prepared according to claim 8.

21. A polyamide polymer prepared according to claim 9.

22. A polyamide polymer prepared according to claim 10.

References Cited

UNITED STATES PATENTS

| | | | |
|---|---|---|---|
| 3,297,730 | 1/1967 | Fischer et al. | 260—18 X |
| 3,257,342 | 1/1966 | Kwong | 260—404.5 X |
| 3,239,545 | 3/1966 | Rogier | 260—404.5 |
| 2,379,413 | 7/1945 | Bradley | 260—404.5 |
| 2,130,948 | 9/1938 | Carothers | 260—78 |

FOREIGN PATENTS

| | | |
|---|---|---|
| 1,000,216 | 8/1965 | Great Britain. |
| 1,359,955 | 3/1964 | France. |
| 645,836 | 7/1964 | Belgium. |

DONALD E. CZAJA, Primary Examiner

C. W. IVY, Assistant Examiner

U.S. Cl. X.R.

156—331; 161—214; 260—78, 404.5

UNITED STATES PATENT OFFICE
CERTIFICATE OF CORRECTION

Patent No. 3,499,853    Dated March 10, 1970

Inventor(s) Griebsch and Drawert

It is certified that error appears in the above-identified patent and that said Letters Patent are hereby corrected as shown below:

In the Heading, after "Sch 36,748" insert:

--; April 1, 1967, Sch 40,478.--

Signed and sealed this 17th day of August 1971.

(SEAL)
Attest:

EDWARD M. FLETCHER, JR.          WILLIAM E. SCHUYLER, JR.
Attesting Officer                Commissioner of Patents